(12) United States Patent
Revankar et al.

(10) Patent No.: US 11,663,395 B2
(45) Date of Patent: May 30, 2023

(54) AUTOMATED CUSTOMIZATION OF USER INTERFACE

(71) Applicant: ACCENTURE GLOBAL SOLUTIONS LIMITED, Dublin (IE)

(72) Inventors: Trilok Ravindra Revankar, Mumbai (IN); Yogesh Shivraj Shahir, Mumbai (IN); Navin Kajmanikar, Plain City, OH (US); Juhi Jain, Mumbai (IN); Arjun Devayya Teddu, Mumbai (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 17/525,677

(22) Filed: Nov. 12, 2021

(65) Prior Publication Data
US 2022/0147698 A1 May 12, 2022

(30) Foreign Application Priority Data
Nov. 12, 2020 (IN) .............................. 202011049482

(51) Int. Cl.
| | |
|---|---|
| *G06F 40/16* | (2020.01) |
| *G06F 9/451* | (2018.01) |
| *G06F 40/14* | (2020.01) |
| *G06F 40/186* | (2020.01) |
| *G06F 16/958* | (2019.01) |
| *G06F 16/957* | (2019.01) |
| *G06F 40/117* | (2020.01) |
| *G06N 20/00* | (2019.01) |

(Continued)

(52) U.S. Cl.
CPC .............. *G06F 40/16* (2020.01); *G06F 9/451* (2018.02); *G06F 16/958* (2019.01); *G06F 16/9577* (2019.01); *G06F 40/117* (2020.01); *G06F 40/14* (2020.01); *G06F 40/186* (2020.01); *G06F 40/205* (2020.01); *G06F 40/226* (2020.01); *G06N 20/00* (2019.01)

(58) Field of Classification Search
CPC ...... G06F 40/16; G06F 40/117; G06F 40/186; G06F 16/9577
See application file for complete search history.

(56) References Cited

U.S. PATENT DOCUMENTS

| | | | |
|---|---|---|---|
| 9,575,941 | B1 * | 2/2017 | Westbrook .......... G06F 16/9577 |
| 2005/0054381 | A1 | 3/2005 | Lee et al. |

(Continued)

*Primary Examiner* — Scott T Baderman
*Assistant Examiner* — Seung Woon Jung
(74) *Attorney, Agent, or Firm* — Mannava & Kang, P.C.

(57) ABSTRACT

Systems and methods for facilitating an automated customization of user interface are disclosed. The system may include a processor including an AI engine and a UI engine. The AI engine may receive an input data in the form of a pre-defined template that may facilitate the input data to be received in user-readable format. The AI engine may process the pre-defined template to extract input attributes corresponding to the input data. The AI engine may dynamically map the input attributes with sample attributes of a pre-stored file. Based on the dynamic mapping, the AI engine may obtain a form pertaining to an expected visual representation of the web page. The AI engine may facilitate responsive scaling of the form depending on size attributes of the user interface. The UI engine may include a form engine that may customize the form for generation of the web page.

17 Claims, 18 Drawing Sheets

(51) Int. Cl.
G06F 40/226 (2020.01)
G06F 40/205 (2020.01)

(56) References Cited

U.S. PATENT DOCUMENTS

2018/0157468 A1* 6/2018 Stachura .................. G06F 8/34
2021/0055918 A1* 2/2021 Dayanandan ............. G06F 8/10

* cited by examiner

| # | | | | | | | | | | | |
|---|---|---|---|---|---|---|---|---|---|---|---|
| 1 | LAYOUT | HORIZONTAL | | | THEME | LIGHT | | | | | |
| 2 | HEADER FONT SIZE | 14 | | | LABEL FONT FAMILY | ARIAL | | | | | |
| 3 | COMPONENTS | PROPERTY1 | VALUE1 | PROPERTY 2 | VALUE 2 | PROPERTY 3 | VALUE 3 | PROPERTY 4 | VALUE 4 | PARTY5 | VALUE 5 |
| 4 | DROP DOWN | DROP DOWN NAME | TITLE | DROP DOWN LABEL | TITLE | MANDATORY | TRUE | | | MODE | SYNDICATE |
| 5 | TEXT INPUT | TEXT INPUT NAME | FIRST NAME | TEXT INPUT LABEL | FIRST NAME | MANDATORY | TRUE | VALUE | JOHN | MODE | ADMIN |
| 6 | TEXT INPUT | TEXT INPUT NAME | MIDDLE NAME | TEXT INPUT LABEL | MIDDLE NAME | MANDATORY | FALSE | VALUE | MARTIN | MODE | ADMIN |
| 7 | TEXT INPUT | TEXT INPUT NAME | LAST NAME | TEXT INPUT LABEL | LAST NAME | MANDATORY | TRUE | VALUE | PAUL | MODE | ADMIN |
| 8 | LINE BREAK | NO OF BREAK | 1 | | | | | | | | |
| 9 | TEXT INPUT | TEXT INPUT NAME | DOB | TEXT INPUT LABEL | DATE OF BIRTH | MANDATORY | TRUE | VALUE | 32058 | MODE | ADMIN |
| 10 | RADIO BUTTON | RADIO BUTTON NAME | GENDER | RADIO BUTTON LABEL | MALE, FEMALE, OTHER | MANDATORY | FALSH | RADIO BUTTON CHECKED | MALE | MODE | ADMIN |
| 11 | LINE SEPERATOR | IS LAST | TRUE | | | | | | | | |
| 12 | LINE BREAK | NO OF BREAK | 1 | | | | | | | MODE | ADMIN |
| 13 | DROP DOWN | DROP DOWN NAME | COUNTRY | DROP DOWN LABEL | COUNTRY | MANDATORY | TRUE | | | MODE | ADMIN |
| 14 | DROP DOWN | DROP DOWN NAME | STATE | DROP DOWN LABEL | STATE | MANDATORY | TRUE | | | MODE | ADMIN |
| 15 | DROP DOWN | DROP DOWN NAME | CITY | DROP DOWN LABEL | CITY | MANDATORY | TRUE | | | MODE | ADMIN |
| 16 | LINE BREAK | NO OF BREAK | 1 | | | | | | | | |
| 17 | TEXT INPUT | TEXT INPUT NAME | ADDRESS | TEXT INPUT LABEL | ADDRESS | MANDATORY | TRUE | VALUE | VIKHROLI | MODE | SYNDICATE |
| 18 | TEXT INPUT | TEXT INPUT NAME | PINCODE | TEXT INPUT LABEL | PIN CODE | MANDATORY | TRUE | VALUE | 400079 | MODE | SYNDICATE |
| 19 | LINE BREAK | NO OF BREAK | 1 | | | | | | | | SYNDICATE |
| 20 | TEXT INPUT | TEXT INPUT NAME | SOCIAL SEC NUM | TEXT INPUT LABEL | SOCIAL SECURITY NUMBER | MANDATORY | TRUE | VALUE | 34612555656 | MODE | SYNDICATE |
| 21 | TEXT INPUT | TEXT INPUT NAME | HOME PHONE | TEXT INPUT LABEL | HOME NUMBER | MANDATORY | TRUE | VALUE | 2354445455 | MODE | SYNDICATE |
| 22 | TEXT INPUT | TEXT INPUT NAME | WORK PHONE | TEXT INPUT LABEL | WORK NUMBER | MANDATORY | FALSH | VALUE | 5454566666 | MODE | SYNDICATE |
| 23 | TEXT INPUT | TEXT INPUT NAME | EMAIL | TEXT INPUT LABEL | EMAIL ID | MANDATORY | TRUE | VALUE | FFJSS@.COM | MODE | SYNDICATE |
| 24 | LINE SEPERATOR | IS LAST | TRUE | | | | | | | | |
| 25 | LINE BREAK | NO OF BREAK | 1 | | | | | | | | |
| 26 | CHECK BOX | CHECK BOX NAME | LANGUAGES | CHECK BOX LABEL | LANGUAGE | MANDATORY | TRUE | CHECK BOX CHECKED | ENGLISH | MODE | ADMIN |
| 27 | TEXT INPUT | TEXT INPUT NAME | SPECIALIZATION | TEXT INPUT LABEL | SPECIALIZATION | MANDATORY | TRUE | VALUE | FINANCE | MODE | ADMIN |

```
{
  "STARTING_FORM": {
    "LAYOUT": "HORIZONTAL",
    "THEME": "LIGHT",
    "HEADERFONTFAMIY": "ARIAL",
    "OVERRIDE": "YES",
    "LIBRARY": "REACTOFILLIP",
    "ORGANIZATION": "",
    "HEADERFONTSIZE": "14",
    "LABELFONTFAMILY": "ARIAL",
    "LABELFONTSIZE": "10",
    "FRAMEWORK": "ANGULAR",
    "COLUMN": "2",
    "COMPONENTLIST": [
      {
        "TYPE": "LABEL",
        "SELECTOR": "LIB-LABEL",
        "VARIABLENAME": "LABEL3",
        "COLUMNLAYOUT": "COL-12",
        "COLUMNWIDTH": "12",
        "CONFIGS": {
          "ID": "LABEL3",
          "HTMLFOR": "SMART. THIS IS THE FAST TRACK. LET'S GET STARTED",
          "FONTSIZE": "20PX",
          "FONTWEIGHT": "NORMAL"
        }
      },
      {
        "TYPE": "TEXTINPUT",
        "SELECTOR": "LIB-INPUT",
        "VARIABLENAME": "TEXTINPUT4",
        "COLUMNLAYOUT": "COL-3",
        "COLUMNWIDTH": "3",
        "CONFIGS": {
          "ID": "TEXTINPUT4",
          "DISABLED": FALSE,
          "ISREQUIRED": FALSE,
          "ISSHOWLABEL": TRUE,
          "ISSHOWINPUT": TRUE,
          "PLACEHOLDER": "ENTER A FIRST NAME",
          "LABELNAME": "FIRST NAME",
          "INPUTELMNAME": "FIRSTNAME",
          "INPUTID": "FIRSTNAME",
          "TEXTVALUE": "",
          "LABELSHOWTOP": TRUE,
          "LABELSHOWLEFT": FALSE
        }
      },
      {
        "TYPE": "TEXTINPUT",
        "SELECTOR": "LIB-INPUT",
        "VARIABLENAME": "TEXTINPUT5",
}
```

FIG. 4A

```
  "COLUMNLAYOUT": "COL-3",
  "COLUMNWIDTH": "3",
: "MI (OPTIONAL)",
  "INPUTELMNAME": "MIDDLENAME",
  "INPUTID": "MIDDLENAME",
  "TEXTVALUE": "",
  "LABELSHOWTOP": TRUE,
  "LABELSHOWLEFT": FALSE
 }
},
{
 "TYPE": "TEXTINPUT",
 "SELECTOR": "LIB-INPUT",
 "VARIABLENAME": "TEXTINPUT6",
 "COLUMNLAYOUT": "COL-3",
 "COLUMNWIDTH": "3",
 "CONFIGS": {
  "ID": "TEXTINPUT6",
  "DISABLED": FALSE,
  "ISREQUIRED": FALSE,
  "ISSHOWLABEL": TRUE,
  "ISSHOWINPUT": TRUE,
  "PLACEHOLDER": "DATE",
  "LABELNAME": "DATE OF BIRTH",
  "INPUTELMNAME": "DATE",
  "INPUTID": "DATE",
  "TEXTVALUE": "",
  "LABELSHOWTOP": TRUE,
  "LABELSHOWLEFT": FALSE
 }
},
{
 "TYPE": "TEXTINPUT",
 "SELECTOR": "LIB-INPUT",
 "VARIABLENAME": "TEXTINPUT7",
 "COLUMNLAYOUT": "COL-3",
 "COLUMNWIDTH": "3",
 "CONFIGS": {
  "ID": "TEXTINPUT7",
  "DISABLED": FALSE,
  "ISREQUIRED": FALSE,
  "ISSHOWLABEL": TRUE,
  "ISSHOWINPUT": TRUE,
  "PLACEHOLDER": "LAST NAME",
  "LABELNAME": "LAST NAME",
  "INPUTELMNAME": "LASTNAME",
  "INPUTID": "LASTNAME",
  "TEXTVALUE": "",
  "LABELSHOWTOP": TRUE,
  "LABELSHOWLEFT": FALSE
 }
},
{
 "TYPE": "DROPDOWN",
 "SELECTOR": "LIB-DROPDOWN",
 "VARIABLENAME": "DROPDOWN8",
```

```
"COLUMNLAYOUT": "COL-3",
  "COLUMNWIDTH": "3",
  "CONFIGS": {
    "ID": "DROPDOWN8",
    "DISABLED": FALSE,
    "REQUIRED": FALSE,
    "ISSHOWLABEL": TRUE,
    "ISVISIBLE": TRUE,
    "PLACEHOLDER": "CHOOSE YOUR SUFFIX",
    "LABELNAME": "SUFFIX (OPTIONAL)",
    "LABELSHOWTOP": TRUE,
    "LABELSHOWLEFT": FALSE,
    "OPTIONS": [
      {
        "NAME": "JR",
        "VALUE": "JR"
      },
      {
        "NAME": "SR",
        "VALUE": "SR"
      },
      {
        "NAME": "I",
        "VALUE": "I"
      },
      {
        "NAME": "II",
        "VALUE": "II"
      },
      {
        "NAME": "III",
        "VALUE": "III"
      },
      {
        "NAME": "IV",
        "VALUE": "IV"
      },
      {
        "NAME": "V",
        "VALUE": "V"
      },
      {
        "NAME": "VI",
        "VALUE": "VI"
      }
    ]
  }
},
{
  "TYPE": "DROPDOWN",
  "SELECTOR": "LIB-DROPDOWN",
  "VARIABLENAME": "DROPDOWN9",
  "COLUMNLAYOUT": "COL-12",
  "COLUMNWIDTH": "12",
  "CONFIGS": {
```

```
"ID": "DROPDOWN9",
  "DISABLED": FALSE,
  "REQUIRED": FALSE,
  "ISSHOWLABEL": TRUE,
  "ISVISIBLE": TRUE,
  "PLACEHOLDER": "CHOOSE YOUR STATE",
  "LABELNAME": "STATE",
  "LABELSHOWTOP": TRUE,
  "LABELSHOWLEFT": FALSE,
  "OPTIONS": [
    {
      "NAME": "AL",
      "VALUE": "AL"
    },
    {
      "NAME": "AR",
      "VALUE": "AR"
    },
    {
      "NAME": "AZ",
      "VALUE": "AZ"
    },
    {
      "NAME": "CA",
      "VALUE": "CA"
    },
    {
      "NAME": "CO",
      "VALUE": "CO"
    }
  ]
 }
},
{
 "TYPE": "LABEL",
 "SELECTOR": "LIB-LABEL",
 "VARIABLENAME": "LABEL10",
 "COLUMNLAYOUT": "COL-12",
 "COLUMNWIDTH": "12",
 "CONFIGS": {
   "ID": "LABEL10",
   "HTMLFOR": "TELL US WHAT YOU NEED TO PROTECT (SELECT ALL THAT APPLY)",
   "FONTSIZE": "20PX",
   "FONTWEIGHT": "NORMAL"
 }
},
{
 "TYPE": "BUTTON",
 "SELECTOR": "LIB-BUTTON",
 "VARIABLENAME": "BUTTON11",
 "COLUMNLAYOUT": "COL-12",
 "COLUMNWIDTH": "12",
 "POSITION": "RIGHT",
 "CONFIGS": {
```

*FIG. 4D*

```
        "ID": "BUTTON11",
        "ISDISABLED": FALSE,
        "ISMANDATORY": FALSE,
        "VALUE": "AGREE \u0026 CONTINUE",
        "POSITION": "RIGHT",
        "LINKPAGE": "/MORE_DETAILS"
      }
    }
  ] "CONFIGS": {
      "ID": "TEXTINPUT5",
      "DISABLED": FALSE,
      "ISREQUIRED": FALSE,
      "ISSHOWLABEL": TRUE,
      "ISSHOWINPUT": TRUE,
      "PLACEHOLDER": "MIDDLE NAME",
      "LABELNAME"
}
```

- USER_SELF_SERVICE
- ACCOUNT_ONBOARDING
- ACCOUNT_OFFBOARDING
- KYC_APPLICATION
- ADD_INVESTOR
- SAMPLE CHART
- DASHBOARD1
- DASHBOARD2
- DEMOGRAPHICS
- GRIDSHOWCASE

TITLE: MISS
FIRST NAME*: JOHN
MIDDLE NAME: MARTIN
LAST NAME*: PAUL
DATE OF BIRTH*: 32058
GENDER: ● MALE  ○ FEMALE  ○ OTHER
COUNTRY: BELIZE
STATE:
CITY: VIKHROLI
ADDRESS*:
PINCODE*: 400079

| | |
|---|---|
| PLEASE FILL THE MANDATORY FIELDS | |
| TITLE | MISS ∨ |
| MIDDLE NAME | MARTIN |
| DATE OF BIRTH* | |
| GENDER | ● MALE ○ FEMALE ○ OTHER |
| COUNTRY | BELIZE ∨ |
| CITY | ∨ |

FIRST NAME*  
LAST NAME*  
STATE

PLEASE ENTER ALL THE REQUIRED MANDATORY FIELDS

- USER_SELF_SERVICE
- ACCOUNT_ONBOARDING
- ACCOUNT_OFFBOARDING
- KYC_APPLICATION
- ADD_INVESTOR
- SAMPLE CHART
- DASHBOARD1
- DASHBOARD2
- DEMOGRAPHICS
- GRIDSHOWCASE

| Project Number | Account Officer | | | | | |
|---|---|---|---|---|---|---|
| TX34-3652-21 | Ding, Kirby | Enlinger, LLC | POC ERM | 2200 Anenue Ave, Dallas | 42702 | New | Appraisal |
| TX34-3652-22 | Ding, Kirby | Enlinger, LLC | POC ERM | 2200 Anenue Ave, Dallas | 42702 | 20 | Appraisal |
| TX34-3652-23 | Ding, Kirby | Enlinger, LLC | POC ERM | 2200 Anenue Ave, Dallas | 42702 | 45 | Appraisal |
| TX34-3652-24 | Ding, Kirby | Enlinger, LLC | POC ERM | 2200 Anenue Ave, Dallas | 42702 | 50 | Appraisal |

AUTOMATED CUSTOMIZATION OF USER INTERFACE

PRIORITY

The present application claims priority under 35 U.S.C 119(a)-(d) to Indian patent application number 202011049482, having a filing date of Nov. 12, 2020, the disclosure of which is hereby incorporated by reference in its entirety.

BACKGROUND

A user interface (UI) is a communication point at which a person or an individual may be able to interact with a device, such as a computer through a website or an application. The communication is achieved through an implementation of a web page. The web page may be a hypertext document displayed to a user in a web browser. The web page may collect information from the individual through web forms. The information may be handled by one or more corresponding microservices or back end implementation pertaining to the web page. The web pages and corresponding microservices may be important in the development of a software application. This may involve multiple creators/users having different areas of technical expertise, such as, for example, a business analyst (BA) and a developer. The BA may be in direct interaction with a client who may have specific requirements pertaining to an expected representation of the web page for his/her application. However, the BA may be able to only provide a mock screen diagram whereas the actual web page may be developed by the developer. This may lead to a gap with regards to transmission of details between the BA and the developer. Therefore, the final delivery may not meet the expectations of the client/BA.

Even with the use of conventional techniques such as wireframes, there may be minor differences in the placement of components on the web page, thus requiring multiple and iterative development efforts. Further, the use/update of wireframes may be costly and challenging. Although, known techniques such as, for example, ReactJS, may be available for web page generation, however, they may lack suitability of usage for non-technical users, such as the BA. Thus, the known techniques may fail to integrate productivity of the developer with the business acumen of the BA, thereby causing an ineffective use of time and resources.

SUMMARY

An embodiment of present disclosure includes a system including a processor. The processor may include an artificial intelligence (AI) engine and a user interface (UI) engine. The AI engine may receive an input data from a user. The input data may be in the form of a pre-defined template. The pre-defined template may facilitate the input data to be received in a user-readable format. The input data may be indicative of an expected visual representation of a web page at a user interface. The AI engine may process the pre-defined template to extract input attributes corresponding to the input data. The AI engine may dynamically map the input attributes with sample attributes of a pre-stored file in a database. The dynamic mapping may be performed by using a first AI model of the engine. Based on the dynamic mapping, the AI engine may obtain a form pertaining to the expected visual representation. The UI engine may include a form engine, which, when executed using a processor, may cause the form engine to customize the form for generation of the web page at the user interface. The AI engine may facilitate responsive scaling of the form depending on size attributes of the user interface.

Another embodiment of the present disclosure may include a method for facilitating an automated customization of a user interface. The method includes a step of receiving an input data from a user. The input data may be in the form of a pre-defined template. The pre-defined template may facilitate the input data to be received in a user-readable format. The input data may be indicative of an expected visual representation of a web page at a user interface. The method includes a step of processing the pre-defined template to extract input attributes corresponding to the input data. The method may include a step of dynamically mapping the input attributes with sample attributes of a pre-stored file in a database to obtain a form pertaining to the expected visual representation. The method includes a step of facilitating responsive scaling of the form depending on size attributes of the user interface. The method includes a step of customizing, by the processor, the form to generate the web page at the user interface.

Yet another embodiment of the present disclosure may include a non-transitory computer readable medium comprising machine executable instructions that may be executable by a processor to receive an input data from a user. The input data may be in the form of a pre-defined template. The pre-defined template may facilitate the input data to be received in a user-readable format. The input data may be indicative of an expected visual representation of a web page at a user interface. The processor may process the pre-defined template to extract input attributes corresponding to the input data. The processor may dynamically map the input attributes with sample attributes of a pre-stored file in a database to obtain a form pertaining to the expected visual representation. The processor may facilitate responsive scaling of the form depending on size attributes of the user interface. The processor may customize the form to generate the web page at the user interface.

BRIEF DESCRIPTION OF DRAWINGS

FIG. 3 illustrates an exemplary representation of a pre-defined template of an input data, according to an example embodiment of the present disclosure.

FIGS. 4A-4E illustrate an exemplary representation of a first executable file in JSON format, according to an example embodiment of the present disclosure.

FIGS. 5A-5B illustrate exemplary representations depicting a sample screen prior to responsive scaling and post responsive scaling of components respectively, according to an example embodiment of the present disclosure.

FIG. 5C illustrate an exemplary representation depicting validation pertaining to a web page, according to an example embodiment of the present disclosure.

DETAILED DESCRIPTION

Figure 1:
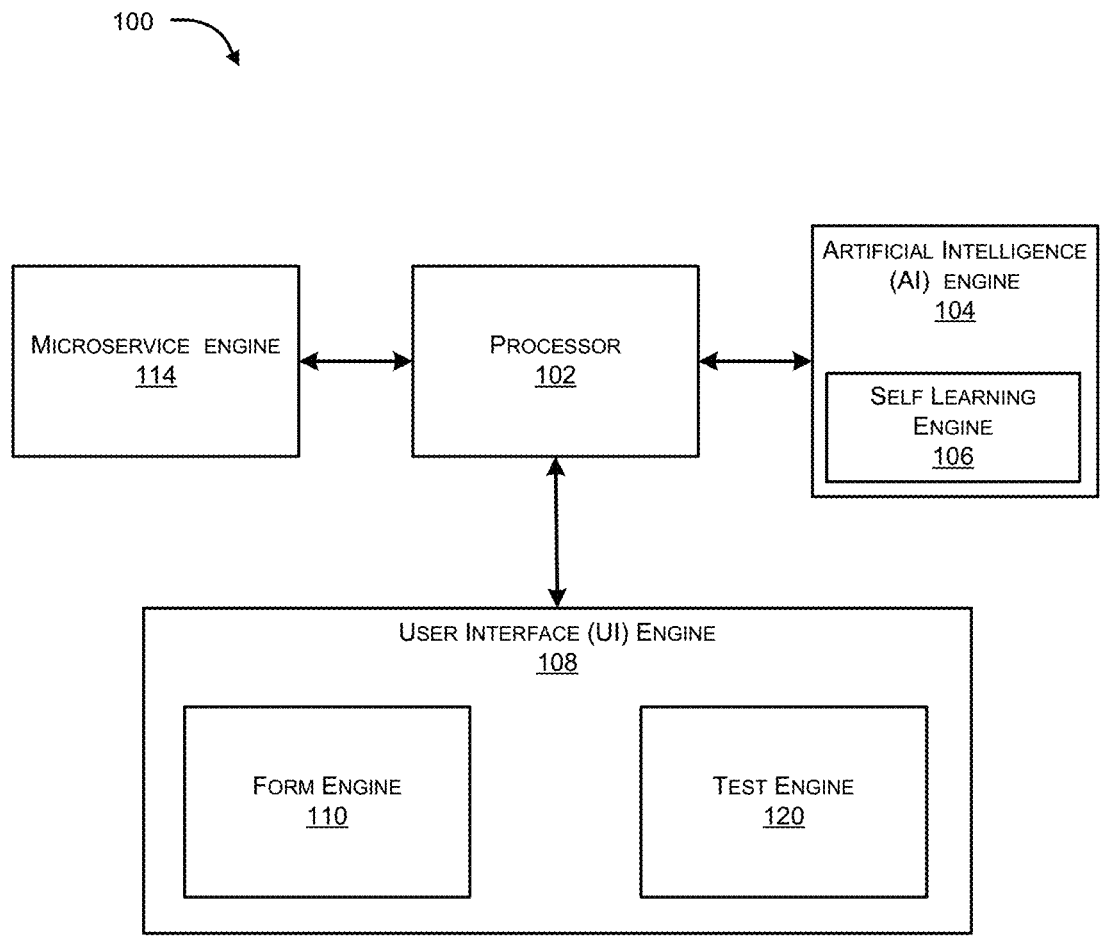
FIG. 1 illustrates a system for facilitating automated customization of user interface, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "a" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being performed or considered.

OVERVIEW

Various embodiments describe providing a solution in the form of a system and a method for facilitating an automated customization of a user interface. The system may include a processor. The processor may include an AI engine and a UI engine. The AI engine may receive an input data from a user. The input data may be in the form of a pre-defined template. The pre-defined template may facilitate the input data to be received in a user-readable format. The input data may be indicative of an expected visual representation of a web page at a user interface. The AI engine may process the pre-defined template to extract input attributes corresponding to the input data. The AI engine may dynamically map the input attributes with sample attributes of a pre-stored file in a database. The dynamic mapping may be performed by using a first AI model of the engine. Based on the dynamic mapping, the AI engine may obtain a form pertaining to the expected visual representation. The UI engine may customize the form for generation of the web page at the user interface. In an example embodiment, the AI engine may facilitate responsive scaling of the form depending on size attributes of the user interface. The system may also include a self-learning engine. The self-learning engine may implement a self-learning loop based on a feedback from the user. The self-learning loop may facilitate an incorporation of the feedback during generation of a second expected web page corresponding to the user. In an example embodiment, the system may include a microservice engine that may generate a microservice corresponding to the generated web page. The microservice may cater to processing and storage of data collected through the generated web page.

Exemplary embodiments of the present disclosure have been described in the framework for facilitating an automated customization of user interface. The embodiments may describe a system and a method to perform automated customization of the user interface. The automated customization may enable to automate the generation of forms and corresponding web pages. This may significantly reduce the complexity and required time that is otherwise involved in manual development for web page designing. The overall training time of non-technical users may also be reduced. The implementation may offering simplicity of usage and greater flexibility for users such as, for example, business analysts, thus reducing the existing gap between an expected customization and the actual results of web page generation. The system and method of the present disclosure may also facilitate other automated features such as, for example, self-learning loop for incorporating a user feedback during future customization. The system and method of the present disclosure may be applied to several applications that involve use of web pages/application pertaining to business organizations, such as, for example, employment sector, banking sector, insurance agencies, travel agencies, service providers, health care, and other such fields. The system and method of the present disclosure may facilitate to provide customized web pages based on the industry and requirement of the services related to the business. However, one of ordinary skill in the art will appreciate that the present disclosure may not be limited to such applications/business. The system and method may also be used for generation of microservices that may cater to processing and storage of data collected through the generated web page. In an example embodiment, the microservice may be generated for developing a software application through the web pages. Several other advantages/features of the implementation may be realized.

FIG. 1 illustrates a system 100 for facilitating automated customization of user interface, according to an example embodiment of the present disclosure. The system 100 may be implemented by way of a single device or a combination of multiple devices that are operatively connected or networked together. The system 100 may be implemented in hardware or a suitable combination of hardware and software. The system 100 includes a processor 102. The processor 102 may include an AI engine 104 and a UI engine 108. The AI engine 104 may receive an input data from a user. The input data may be in the form of a pre-defined template. The pre-defined template may facilitate the input data to be received in a user-readable format. For example, the pre-defined template may be an EXCEL® sheet template including multiple tabs, columns and rows for adding inputs. The input data may be indicative of an expected visual representation of a web page at a user interface. For example, the input data may indicate how the user may expect the web page to look like and hence may describe features such as, for example, layout style, formatting requirements and other such aspects. In an example embodiment, the AI engine 104 may process the pre-defined template to extract input attributes corresponding to the input data. The AI engine 104 may dynamically map the input attributes with sample attributes of a pre-stored file in a database. The dynamic mapping may be performed by using a first AI model of the engine. Based on the dynamic mapping, the AI engine 104 may obtain a form pertaining to the expected visual representation.

As illustrated in FIG. 1, the UI engine 108 may include a form engine 110 and a test engine 120. The form engine 110 may customize the form for generation of the web page at the user interface. The test engine 120 may test one or more properties of the web pages. The AI engine 104 may facilitate responsive scaling of the form depending on size attributes of the user interface. This may facilitate to perform dynamic size base alteration of the web page depending on the size attributes of each target device from multiple target devices. For example, the responsive scaling may ensure that viewability of the web page is automatically adjusted when an end user views the web page on different target devices such as a mobile phone as well as relatively larger target devices such as tablets or laptops. In an example embodiment, the processor 102 may also include a self-learning engine 106. The self-learning engine 106 may receive a feedback from the user. The feedback may correspond to the generated web page. Based on the feedback, the self-learning engine 106 may implement a self-learning loop for the AI model. The self-learning loop may facilitate an incorporation of the feedback during generation of a second expected web page corresponding to the user. In an example embodiment, the processor may include a microservice engine 114. The microservice engine 114 may generate a microservice corresponding to the generated web page. In an example embodiment, the microservice may generated based on an architectural implementation and code orchestration. The microservice may cater to processing and storage of data collected through the generated web page.

Figure 2:
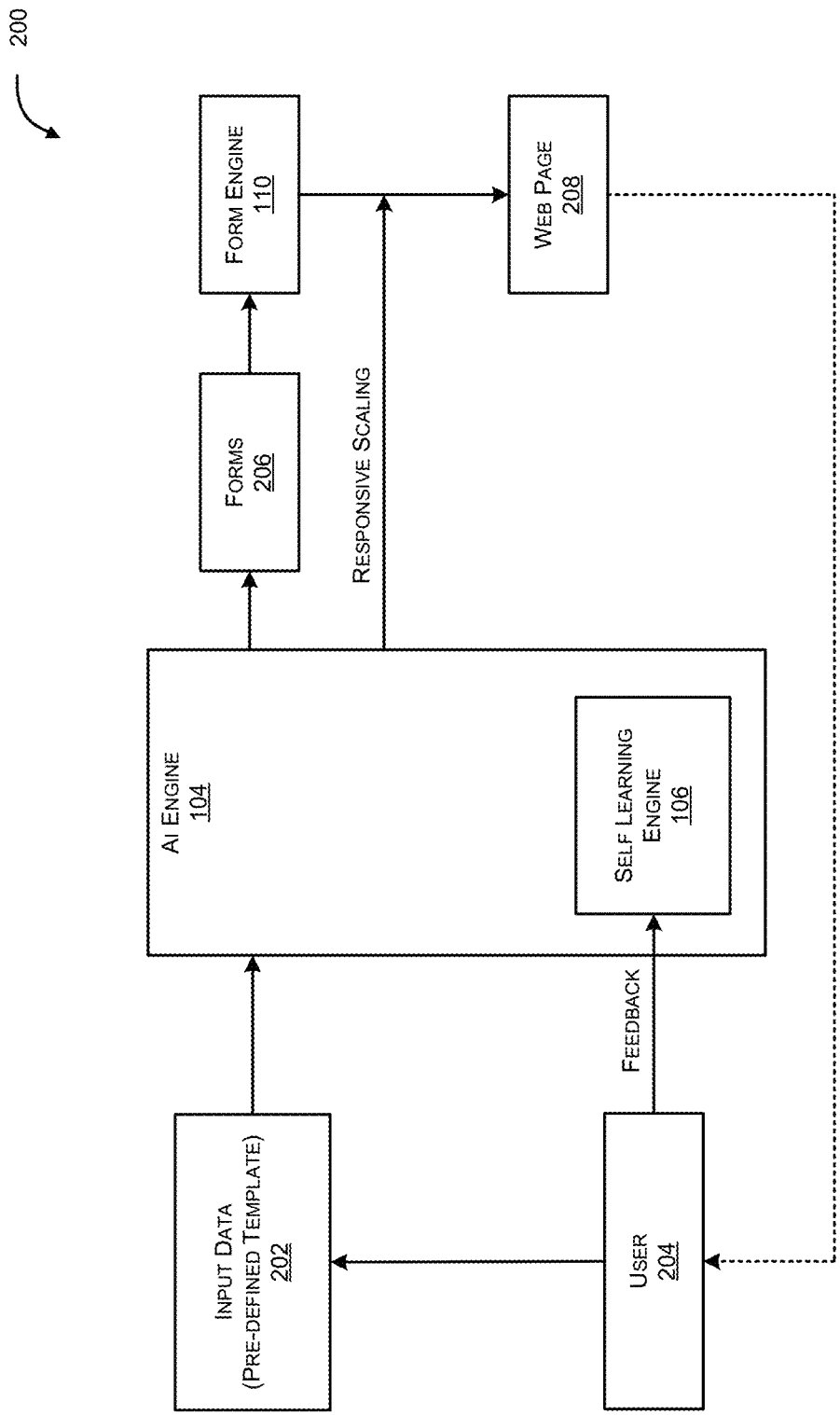
FIG. 2 illustrates an exemplary representation of various stages pertaining to automated customization of user interface, according to an example embodiment of the present disclosure.

The system 100 may be a hardware device including the processor 102 executing machine readable program instructions to facilitate automated customization of user interface. Execution of the machine readable program instructions by the processor 102 may enable the proposed system to facilitate automated customization of user interface. The "hardware" may comprise a combination of discrete components, an integrated circuit, an application-specific integrated circuit, a field programmable gate array, a digital signal processor, or other suitable hardware. The "software" may comprise one or more objects, agents, threads, lines of code, subroutines, separate software applications, two or more lines of code or other suitable software structures operating in one or more software applications or on one or more processors. The processor 102 may include, for example, microprocessors, microcomputers, microcontrollers, digital signal processors, central processing units, state machines, logic circuits, and/or any devices that manipulate data or signals based on operational instructions, Among other capabilities, processor 102 may fetch and execute computer-readable instructions in a memory operationally coupled with system 100 for performing tasks such as data processing, input/output processing, data extraction, dynamic mapping and/or any other functions. Any reference to a task in the present disclosure may refer to an operation being or that may be performed on data, FIG. 2 illustrates an exemplary representation 200 for facilitating an automated customization of a user interface, according to an example embodiment of the present disclosure. As illustrated in FIG. 2, the AI engine 104 may receive an input data 202 from a user 204. The input data may be in the form of a pre-defined template that facilitates the input data to be received in a user-readable format. In an example embodiment, the pre-defined template may be a configurable document that facilitates the user to include the input data in an alphanumeric format. For example, the input data may be added in the user readable format such as, for example, in an EXCEL® sheet template by typing alphabets and numerals in a standard language, such as standard Roman script. This may enable the reduce the complexity or technical skills otherwise involved in conventional web page development. FIG. 3 illustrates an exemplary representation 300 of a pre-defined template of an input data, according to an example embodiment of the present disclosure. As shown in FIG. 3 and as per an example embodiment, the pre-defined template may be an EXCEL® sheet template. In an example embodiment, the input data may pertain to selection of a descriptive feature pertaining to the expected visual representation of the web page. The descriptive feature may facilitate to add details related to expected components by simple text based description of corresponding features and/or values. In an example embodiment, the descriptive feature may include at least one of formatting style, formatting size, theme, layout type and information related to components, component name, component properties, component values and associated events. The formatting style, formatting size, theme, layout type may depend on requirements of a service/product corresponding to the web page and/or preference of the user with respect to the expected visual representation. For example, the layout can be described to be horizontal or vertical. In another example, if the expected visual representation may be desired to be formal, the theme and/or formatting style may be selected accordingly. In an example embodiment, the user may also be able to describe various components, component name, component properties and/or component values. The term "components" may pertain to elements, items and/or fields that may be required to be shown as per the expected visual representation of the web page. The component name, component properties and/or component values may describe the component better. For example, a user may wish to add an item related to "title" entry that may be expected to include a dropdown menu format. In this example, the component name may be selected by the user as "dropdown", the component properties may be provided as "dropdownName" and the component value may be described as "title." The pre-defined template may also facilitate the user to mention associated events. For example, the associated events may include functions, such as, for example, onKeyup, onClick and other such functions pertaining to appearance based property of the components in the web page. The pre-defined template may also facilitate the user to incorporate pre-defined rules. In an example embodiment, the pre-defined rules may be related to entitlement given to a user. For example, the user may be an administrative person and the pre-defined rules may allow the user to edit and/or view more information (screen features) than an end user or another administrative person. In the instant example and as shown in FIG. 3, the last column (labelled as value 5) indicates which aspects/features of the web page should be visible to an administrative person (labelled as "admin") and other persons/end user (labelled as "syndicate"). In an alternate example embodiment, the pre-defined rules may include an override option to be set as "true". The execution of the override option may require the AI Engine to upgrade latest available pre-defined node-module package before preparing the first executable file. This feature may allow automated update of the pre-stored file, prior to generation of the first executable file. This may avoid the need for frequent update by automating the update. Several other aspects may be described through the pre-defined template.

Referring back to FIG. 2, upon receipt of the input data (pre-defined template) 202, the AI engine may generate a form 206 as an output. The AI engine 104 may process the pre-defined template to extract input attributes corresponding to the input data. In an example embodiment, the processing of the pre-defined template may be performed by parsing the input data to extract the input attributes in the form of the components and corresponding key values. The extraction may vary based on the type of the pre-defined template. For example, when the pre-defined template may be an EXCEL® sheet template, the input data in the pre-defined template may be parsed to extract the input attributes from each tab of the EXCEL® sheet template. In the instant example, the input attributes that may be extracted from each tab may include information pertaining to the components (as shown in the exemplary table in FIG. 3) and their corresponding values. Based on the extracted input attributes, the AI engine may assess each input attribute to generate key parameters required to obtain the expected visual representation of the web page. In an example embodiment, the key parameters may include at least one of Cascading Style Sheets (CSS) attributes, CSS class name, and document libraries. For example, based on the extracted input attributes (such as components and their corresponding values), the AI engine 104 may identify the corresponding document libraries and fetch the pre-stored file such as, for example, pre-defined node-module package and other package imports from the database. For example, the AI engine 104 may retrieve node module package (NPM) from a NPM artifactory. In the next stage, the AI engine 104 may dynamically map the extracted input attributes with sample attributes of the pre-stored file (such as pre-defined node-module package) to obtain a form pertaining to the expected visual representation. The dynamic mapping may be performed using a first AI model of the AI engine 104. In an example embodiment, the first AI model may include a Random Forest algorithm. In an example embodiment, the dynamic mapping may be performed by matching the input attributes with the sample attributes with respect to each component. In this case, the mapping may also allow to verify presence of error components. The dynamic nature of the mapping may be evident from the fact that aspects such as, for example, library selection, package imports, and other such aspects may be driven at runtime. Based on the dynamic mapping, the AI engine 104 may generate a first executable file such that an execution of the first executable file facilitates generation of the form. For example, the first executable file may be in JavaScript Object Notation (JSON) format. FIGS. 4A-4E illustrate an exemplary representation (shown over different pages as 400-1 to 400-5) of a first executable file in JSON format, according to an example embodiment of the present disclosure. For ease of reference, a single JSON file has been shown over multiple figures FIGS. 4A-4E, and is supposed to be viewed in a given sequence (400-1, 400-2, 400-3, 400-4, 400-5). In an example embodiment, the first executable file may include information related to at least one of the input attributes, the key parameters, and pre-defined node-modules packages. For example, the AI engine 104 may prepare a JSON file (as shown in FIGS. 4A-4E) for execution, such that the JSON file may include information pertaining to controls/input attributes fetched from the pre-defined template (such as EXCEL® sheet template), information pertaining to the pre-defined node-module, and information pertaining to document library selected. In an example embodiment, if the pre-defined template may be an EXCEL® sheet template, the JSON file may be prepared with respect to each tab. As shown in FIGS. 4A-4E, the first executable file (JSON) shows correspondence or similarity with the input data (of FIG. 3). For example, the details of the layout, theme, header, component details, and other such aspects correspond to the EXCEL® sheet template of FIG. 3. Further, the JSON file of FIGS. 4A-4E also includes override status as "yes" for retrieving updated pre-defined node-modules packages as explained hereinabove. In addition, the JSON file may also include details pertaining to the document library, framework on which the web page may be generated (such as for example, ReactJS, Angular or other framework options). It may be appreciated that the JSON file in FIGS. 4A-4E may only be exemplary and provided for the sake of clarity.

In an example embodiment, once the first executable file may be prepared, an execution of the first executable file facilitates generation of the form 206 (also hereinafter referred to as a screen). Referring back to FIG. 2, the form engine 110 may facilitate to customize the form 206 for generation of a web page 208 at the user interface. For example, the form engine 110 may evaluate each generated form by the by parsing the components therein. The evaluation may firstly assess, if the components are valid. In an example embodiment, if the components may be valid, the AI engine 104 may perform the responsive scaling for the valid components and may prepare a second executable file. The execution of the second executable file may lead to generation of the web page. In an example embodiment, the second executable file may be in JSON format. In an alternate embodiment, if the components are invalid, the form engine 110 may remove an error component corresponding to the invalid component. Thus, the customization by the form may ensure a second level of verification and removal of invalid components prior to scaling and creation of the second executable file. In an example embodiment, the AI engine 104 may facilitate responsive scaling of the form depending on size attributes of the user interface. The user interface may correspond to multiple target devices such that the size attributes of the user interface may pertain to varying screen size of the multiple target devices. The responsive scaling may facilitate dynamic size base alteration of the web page depending on the size attributes of each target device from the multiple target devices. For example, an end user or a client may access the user interface at the front end at various different possible devices such as, for example, tablet, mobile phone, laptop and other such devices. Each of these devices may have a different screen size and resolution properties. Hence, the generated web page may be required to be created based on the target device and its corresponding size attributes. In an example embodiment, the AI engine 104 can facilitate to scale the component by using a second AI model. For example, the second AI model may include K-Nearest Neighbor (KNN) algorithm. In an example embodiment, the second AI model may be trained with training data fed as input during training phase of the second AI model. For example, the training data may include collection of screens/snapshots on internet used in various banking applications.

Figure 5B:

FIG. 5A-5B illustrate an exemplary representation 500 and 520 depicting a sample screen before and after responsive scaling of components respectively, according to an example embodiment of the present disclosure. As shown in 500, the components, such as, for example, the entry fields including title, first name, middle, name, last name, date of birth, and other details are included. However, the components may not be scaled as several other components are missing from the screen. This shows that the displayed form in 500 (FIG. 5A) may be magnified more than an expected extent with respect to the screen attributes of the target device pertaining to the user interface. As shown in 520, the responsive scaling allows scaling of the components based on the screen attributes of the target device and hence the components that may be missing in the representation 500 of FIG. 5A. For example, the components related to social security number, home phone, email ID are not visible in the representation 500, but are visible in FIG. 5B due to responsive scaling. As the forms are responsive to the scaling, this facilitates to render the forms suitably on any device, such as, for example, desktop, (such as full high definition (FHD), high definition (HD) monitors), tablet, mobile phones and other such target devices. Thus, the forms may be scaled to render on any target device without getting corresponding controls scattered or overlapping on another control. In an example embodiment, the responsive scaling may be performed by utilizing techniques including at least one of Mediaquery and Bootstrap. For example, the Mediaquery may be utilized when the details of the target device such as, for example, height, width and margin may be known. In another example, in case if the size attributes of the target device may not be known, the processor may implement responsive scaling through BootStrap and React and/or Angular. In an example embodiment, the system may facilitate to enable to include validation pertaining to one or more missing entries in a field of the web page. The validation may pertain to a pre-defined message that may appear in case of a pre-defined scenario, such as, for example, in case of any missing information in the form. FIG. 5C illustrate an exemplary representation 530 depicting validation pertaining to a web page, according to an example embodiment of the present disclosure. The exemplary representation 530 shows various field entries, out of which entries such as, for example, "first name", "last name", "date of birth", "state" and "city" are unfilled. The processor may facilitate automated pre-defined message such as, for example, "Please enter the required mandatory fields". In an example embodiment, the pre-defined message pertaining to validation may appear, only in case of mandatory field entry. In an alternate example embodiment, the pre-defined message pertaining to validation may appear in case of mandatory field entry as well as non-essential field entries. In an example embodiment, the generation of the web pages may lead to a screen output in the form of grid output and/or dashboard outcome.

Figure 6A:
FIGS. 6A-6B illustrate exemplary representations depicting screen output pertaining to a generated web page, according to an example embodiment of the present disclosure.
Figure 6B:
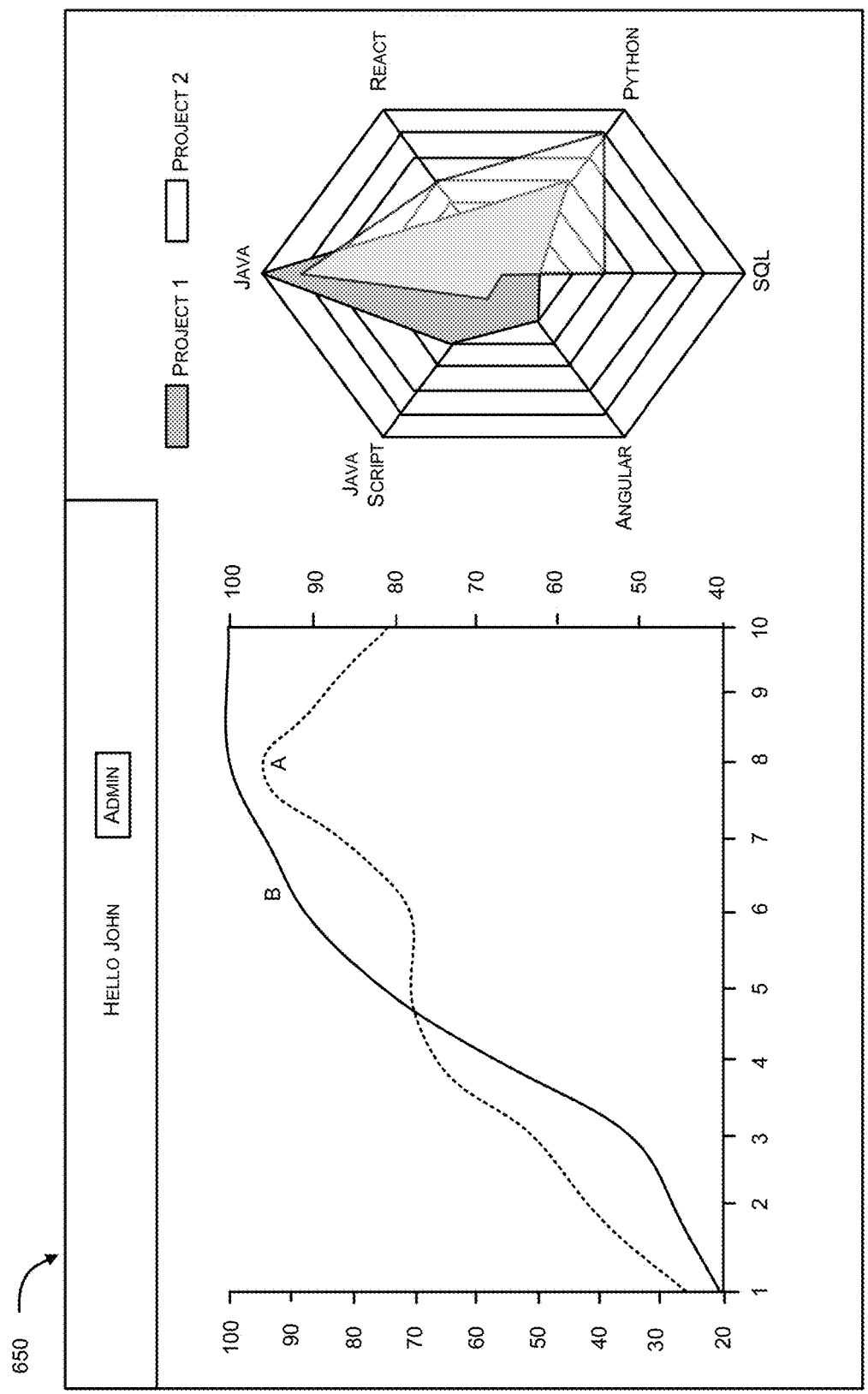

FIGS. 6A-6B illustrate an exemplary representation 600 and 650 depicting screen output pertaining to generated web page, according to an example embodiment of the present disclosure. As shown in 600, the screen output may enable to view content in the form of a grid to. As shown in 650, the screen output may be in the form of a dashboard output that may allow the user to view content pertaining to the web page in the form of the graphical trend. In an example embodiment, the implementation of the present invention may be integrated with various existing techniques such as ReactJS, Angular and otter such implementation so as to collaboratively generate the web page in various viewable formats. Several other type of screen output may be generated.

Referring back to FIG. 2, the generated web page may be assessed by the user 204. Based on the assessment, the user 204 may provide a feedback corresponding to the generated web page. Based on the feedback, the self-learning engine 106 may implement a self-learning loop for the AI model. The self-learning loop may facilitate an incorporation of the feedback during generation of a second expected web page corresponding to the user. For example, the user may add a feedback indicating user preferences that indicates what the user prefers, for example, the feedback may indicate that the user preferred to add a different type of theme to the web page than the one added to the current generated web page. Based on the indicated preferences in the feedback, the system may implement a self-learning loop to ensure incorporation of the user preferences in next cycle of web page generation that is initiated by the same user. In this manner, the preferences of the user may be effectively and automatically introduced without having to mention those preferences each time. In an alternate example embodiment, the user may also be able to include additional pre-defined rules in the feedback. In another alternate example embodiment, the user may also be able to edit the property or nature of the components through the feedback. Thus, the feedback may bridge the gap between the expected representation of the web page and the actual representation obtained by the implementation. In an example embodiment, after the generation of the web page, the self-learning engine 106 may also provide automated recommendations (through self-learning) for improving one or more aspects of the generated web page. Various other such functions may be realized by the implementation of the self-learning engine.

In an example embodiment, after the generation of the web page, the test engine 120 (FIG. 1) may test the generated web pages. The testing may be done to assess if the generated web pages are in compliance with an expected standard. In an example embodiment, the test engine 120 may perform at least one of a unit test generation and an integration test generation. The unit test generation may pertain to unit testing, which is a testing method by which individual units of source code are tested to determine if they are ready to use. The integration test generation may pertain to integration testing that may check an integration between different software modules. Various other standard tests may also be performed. In an example embodiment, the AI engine 104 can evaluate the generated web page and automatically compute a corresponding score value indicative of a correspondence (or similarity) between the generated web page and the expected representation of the web page. The score may be computed based on a set of pre-defined factors such that a value of the score may be indicative of an assessment that checks if one or more factors (from the set of pre-defined factors) are satisfied. In an example embodiment, the AI engine 104 may include a model that may be trained with available libraries as training data, such as for example, collection of screens/snapshots on Internet used in various banking applications along with a score as generated by a field expert (UI expert). Based on the trained model, the AI engine 104 may compute the value of the score. In an example embodiment, the set of pre-defined factors may pertain to at least one of accessibility, value, utility, usability, searchability, credibility and compliance of the generated web page. For example, the generated web page may not be compliant with one or more compliance rules and hence the generated score for compliance may be less. In another example, the generated web pages may be easier to use and hence may include a higher value of score for utility. Several other factors may be pre-defined for assessing the properties of the web page.

In an example embodiment, the score may be computed in various ways. For example, the score value may be calculated by:

Computing score based on total percentage area:
In an example embodiment, to compute the score value, the AI engine 104 may calculate total percentage area of the display area versus the area occupied by the components on the screen. If the total percentage area may be
  a. greater than >50% and lesser than <70%, then score may be 1
  b. greater than >70% (screen is cluttered), then the score may be 0.5
  c. greater than >25 and lesser than <50%, then score may be 0.75
  d. lesser than <25%, then score may be 0.5

Computing score based on font size (if customized in the input)
    e. Font Size of text greater than >10 pt and lesser than 20 pt for 90% then score may be 1
    f. If above is not true, then the score may be 0.5 (too large or too less)
Computing score based on Key tab usability:
If pressing tab passes from one component to another, then score may be 1, otherwise score may be 0
Computing score based on number of fields on the screen:
If the number of fields on the screen is
    a. lesser than <than 10 then score may be 1
    b. greater than >10 and lesser than <30 and no accordions (dividers or sections) are used, then score may be 0.75
    c. greater than >30 and no accordions (dividers or sections) are used, then score may be 0.25
Computing score based on Device compatibility (re-usability)
    a. If a layout may be used (horizontal/vertical/custom) then the score may be 1, The layout may ensure that the same screen can be viewed on multiple devices.
    b. If the above condition is not true then the score may be 0.5
Computing score based on Validations score:
    a. If validations are used on more than 50% of components, then score may be 1
    b. If validations are used on greater than or equal to >=25% and lesser than <50% of components, then score may be 0.5
    c. If validations are used on lesser than <25%, then score may be 0.25 In an example embodiment, the scores may be computed based on American Disability Act (ADA) compliance in overall score. For example,
Score percentage >=75% then rating is "A"
Score percentage >=50% and <75, then rating is "B"
Score percentage <50%, then rating is "C"
In an example embodiment, the score percentage may be calculated using the equation, Score percentage=(actual score/total score)*100.
One of ordinary skill in the art will appreciate that the score calculation described above is an example only and that other factors may be considered for computing the score without departing from the scope of the disclosure.

In an example embodiment, the microservice engine 114 (FIG. 1) of the processor 102 may generate a microservice corresponding to the generated web page. The microservice caters to processing and storage of data collected through the generated web page. In an example embodiment, the microservice may be generated based on an architectural implementation and code orchestration. The microservice may be generated for developing a software application through the web page. In an example embodiment, the processor 102 may facilitate incorporation of toll gates pertinent to the software application to be developed. For example, the toll gates may pertain to at least one of test coverage, integration test coverage, vulnerabilities, and issues leading to a possibility of outage. In an example embodiment, after the generation of the microservice, the system may facilitate implementation of database such as, for example, H2 database, which is an open-source lightweight Java database. The implementation of database may be performed for running unit test cases. The H2 database may be embedded in Java applications or run in the client-server mode, and may be configured to run as in-memory database. The system may also facilitate implementation of logging framework to standardize the process of logging in the application, Other processes to be followed may include unit test generation for executing the unit test cases and preparing build packaging for the application. Various other standard implementation may be included.

Figure 7:
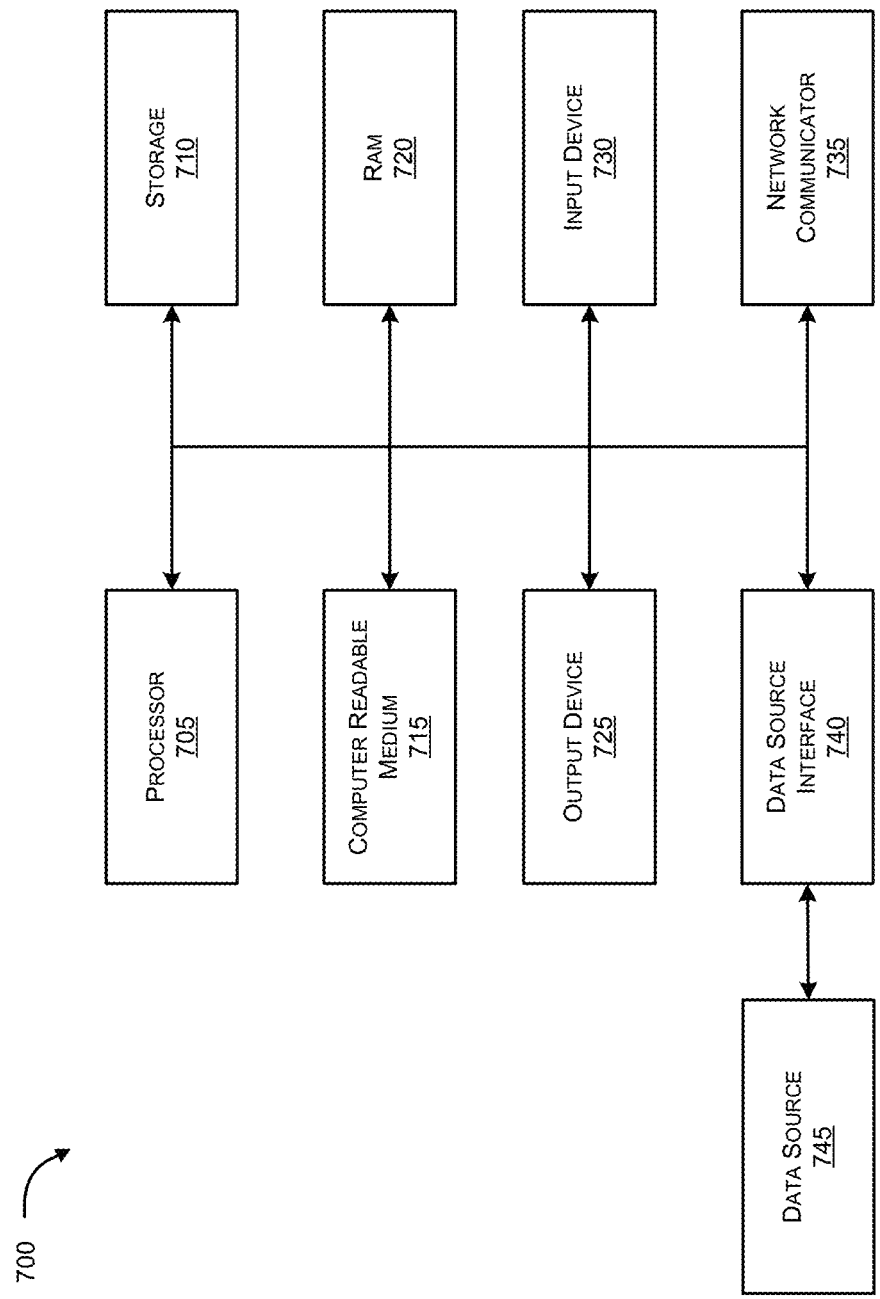
FIG. 7 illustrates a hardware platform for implementation of the disclosed system, according to an example embodiment of the present disclosure.

FIG. 7 illustrates a hardware platform (700) for implementation of the disclosed system, according to an example embodiment of the present disclosure. For the sake of brevity, construction and operational features of the system 100 which are explained in detail above are not explained in detail herein. Particularly, computing machines such as but not limited to internal/external server clusters, quantum computers, desktops, laptops, smartphones, tablets, and wearables which may be used to execute the system 100 or may include the structure of the hardware platform 700. As illustrated, the hardware platform 700 may include additional components not shown, and that some of the components described may be removed and/or modified. For example, a computer system with multiple GPUs may be located on external-cloud platforms including Amazon Web Services, or internal corporate cloud computing clusters, or organizational computing resources, etc.

The hardware platform 700 may be a computer system such as the system 100 that may be used with the embodiments described herein. The computer system may represent a computational platform that includes components that may be in a server or another computer system. The computer system may execute, by the processor 705 (e.g., a single or multiple processors) or other hardware processing circuit, the methods, functions, and other processes described herein. These methods, functions, and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives; and flash memory). The computer system may include the processor 705 that executes software instructions or code stored on a non-transitory computer-readable storage medium 710 to perform methods of the present disclosure. The software code includes, for example, instructions to generate the forms, web pages and/or microservices. In an example, the AI engine 104, the self-learning engine 106, UI engine 108, form engine 110 and test engine 120 may be software codes or components performing these steps.

The instructions on the computer-readable storage medium 710 are read and stored the instructions in storage 715 or in random access memory (RAM). The storage 715 may provide a space for keeping static data where at least some instructions could be stored for later execution. The stored instructions may be further compiled to generate other representations of the instructions and dynamically stored in the RAM such as RAM 720. The processor 705 may read instructions from the RAM 720 and perform actions as instructed.

The computer system may further include the output device 725 to provide at least some of the results of the execution as output including, but not limited to, visual information to users, such as external agents. The output device 725 may include a display on computing devices and virtual reality glasses. For example, the display may be a mobile phone screen or a laptop screen. GUIs and/or text may be presented as an output on the display screen. The computer system may further include an input device 730 to provide a user or another device with mechanisms for entering data and/or otherwise interact with the computer system. The input device 730 may include, for example, a keyboard, a keypad, a mouse, or a touchscreen. Each of these output device 725 and input device 730 may be joined by one or more additional peripherals. For example, the output device 725 may be used to display the web page that is generated by the system 100.

Figure 8:
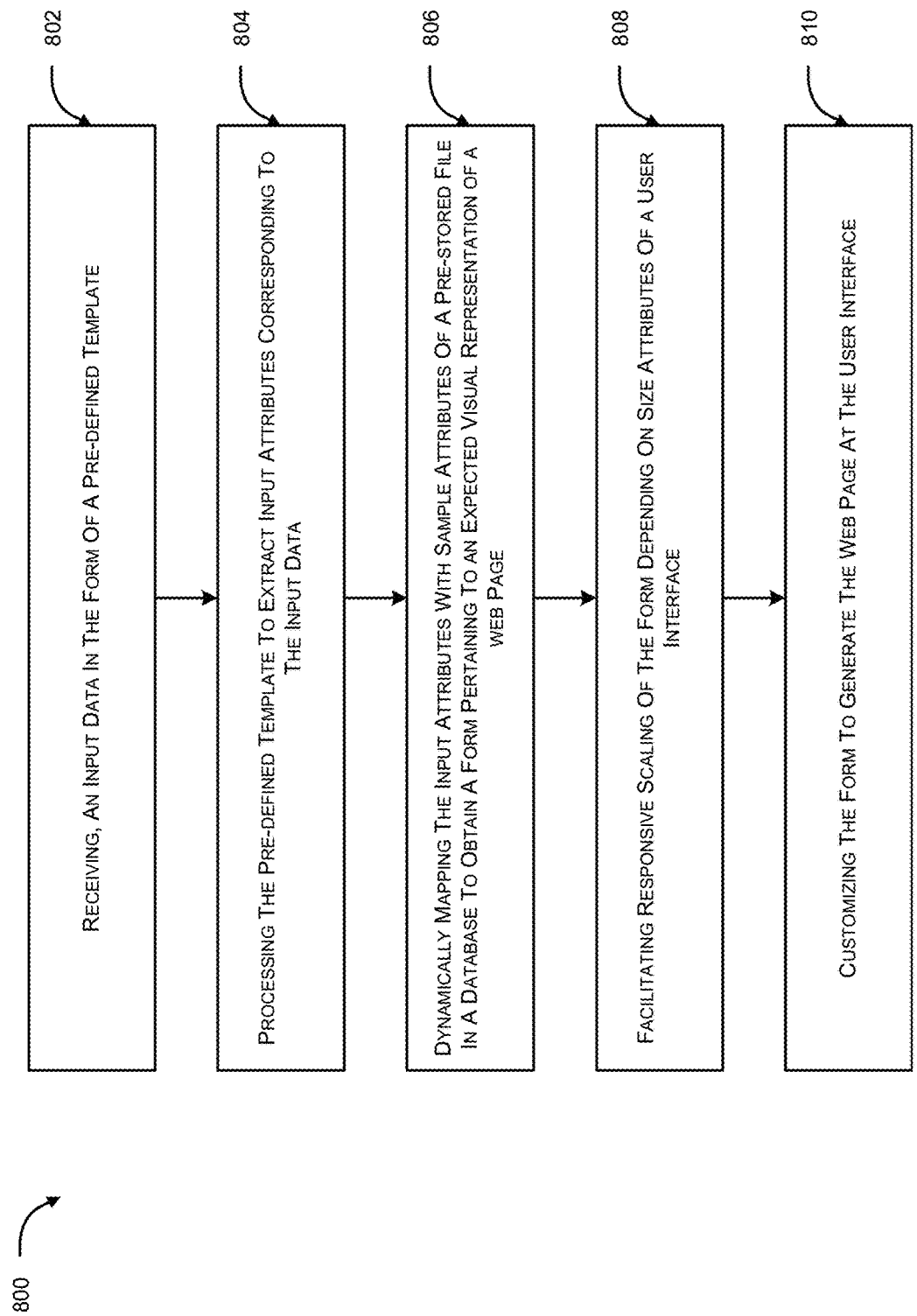
FIG. 8 illustrates a flow diagram for facilitating automated customization of user interface, according to an example embodiment of the present disclosure.

A network communicator 735 may be provided to connect the computer system to a network and in turn to other devices connected to the network including other clients, servers, data stores, and interfaces, for instance. A network communicator 735 may include, for example, a network adapter such as a LAN adapter or a wireless adapter. The computer system may include a data sources interface 740 to access the data source 745. The data source 745 may be an information resource. As an example, a database of exceptions and rules may be provided as the data source 745. Moreover, knowledge repositories and curated data may be other examples of the data source 745, FIG. 8 illustrates a flow diagram 800 for facilitating automated customization of user interface, according to an example embodiment of the present disclosure. At 802, the method includes a step of receiving an input data from a user. The input data may be in the form of a pre-defined template. The pre-defined template may facilitate the input data to be received in a user-readable format. The input data may be indicative of an expected visual representation of a web page at a user interface. At 804, the method includes a step of processing the pre-defined template to extract input attributes corresponding to the input data. At 806, the method may include a step of dynamically mapping the input attributes with sample attributes of a pre-stored file in a database to obtain a form pertaining to the expected visual representation. At 808, the method includes a step of facilitating responsive scaling of the form depending on size attributes of the user interface. At 810, the method includes a step of customizing, by the processor, the form to generate the web page at the user interface.

In an example embodiment, the method may include a step of receiving a feedback from the user. The feedback may correspond to the generated web page. Further, the method may include a step of implementing, based on the feedback, a self-learning loop for the AI model. The self-learning loop may facilitate an incorporation of the feedback during generation of a second expected web page corresponding to the user.

Figure 9A:
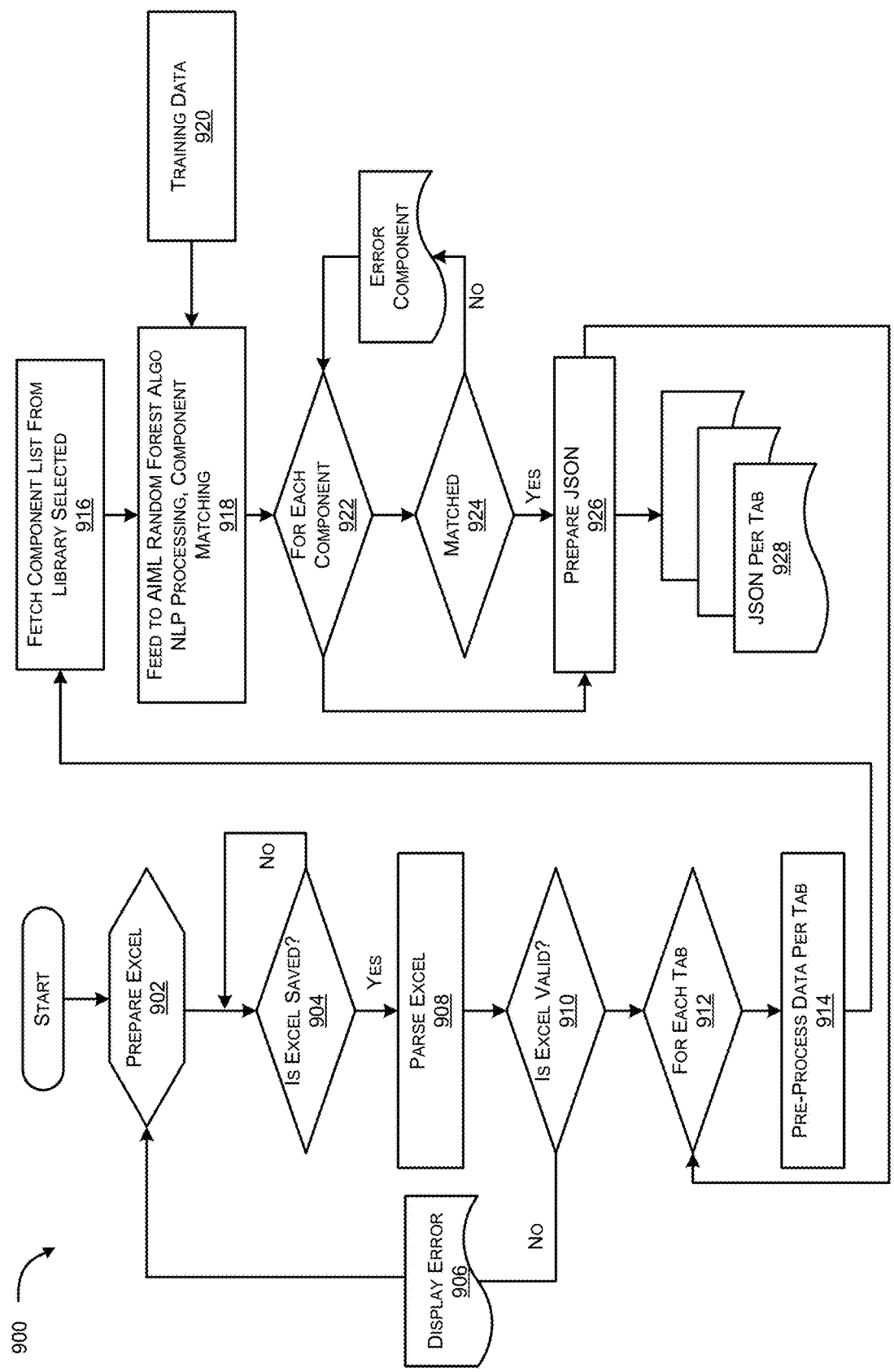
FIGS. 9A-9C illustrate flow diagrams depicting multiple stages involved in facilitating automated customization of user interface, according to an example embodiment of the present disclosure.
Figure 9B:
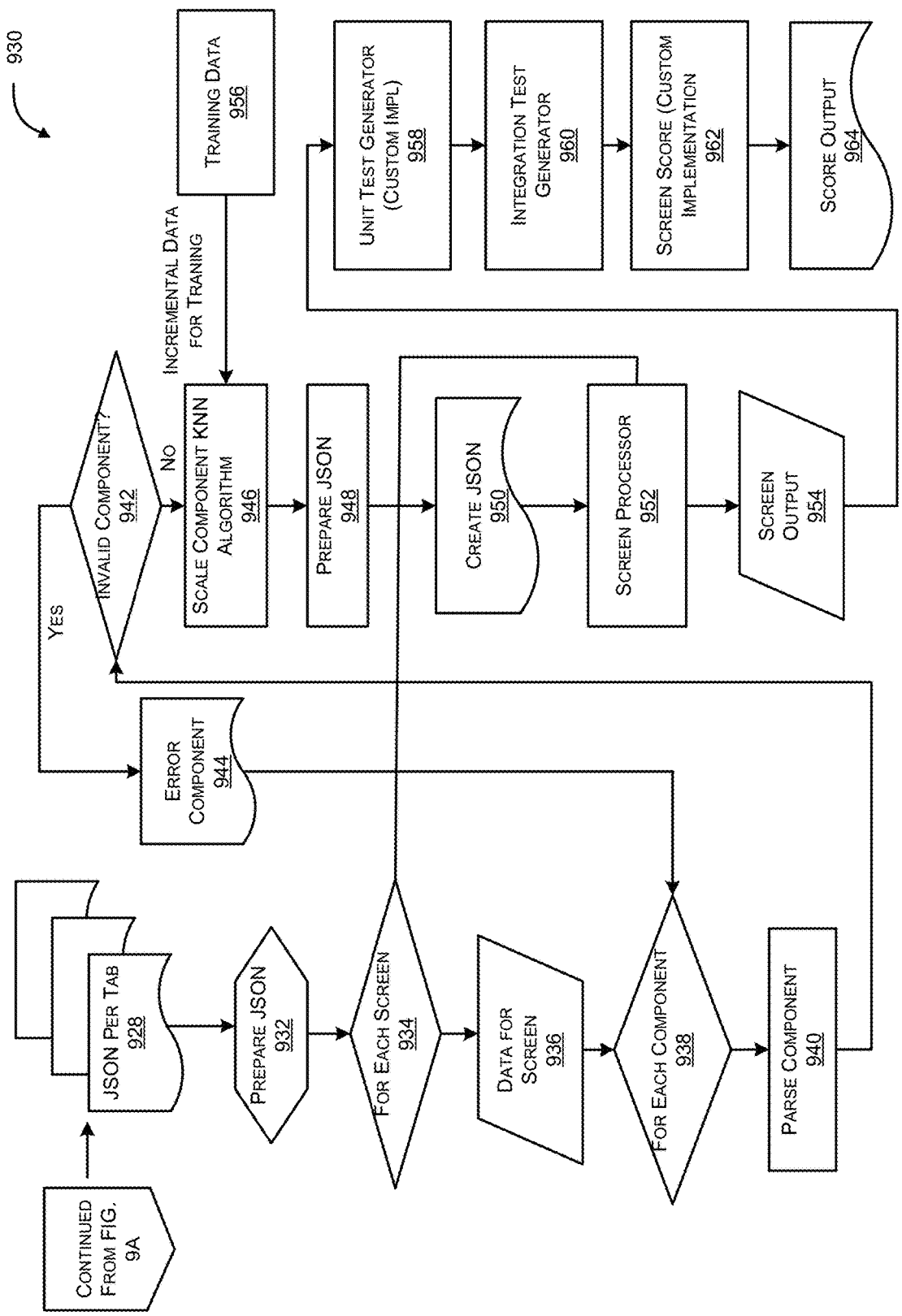
Figure 9C:
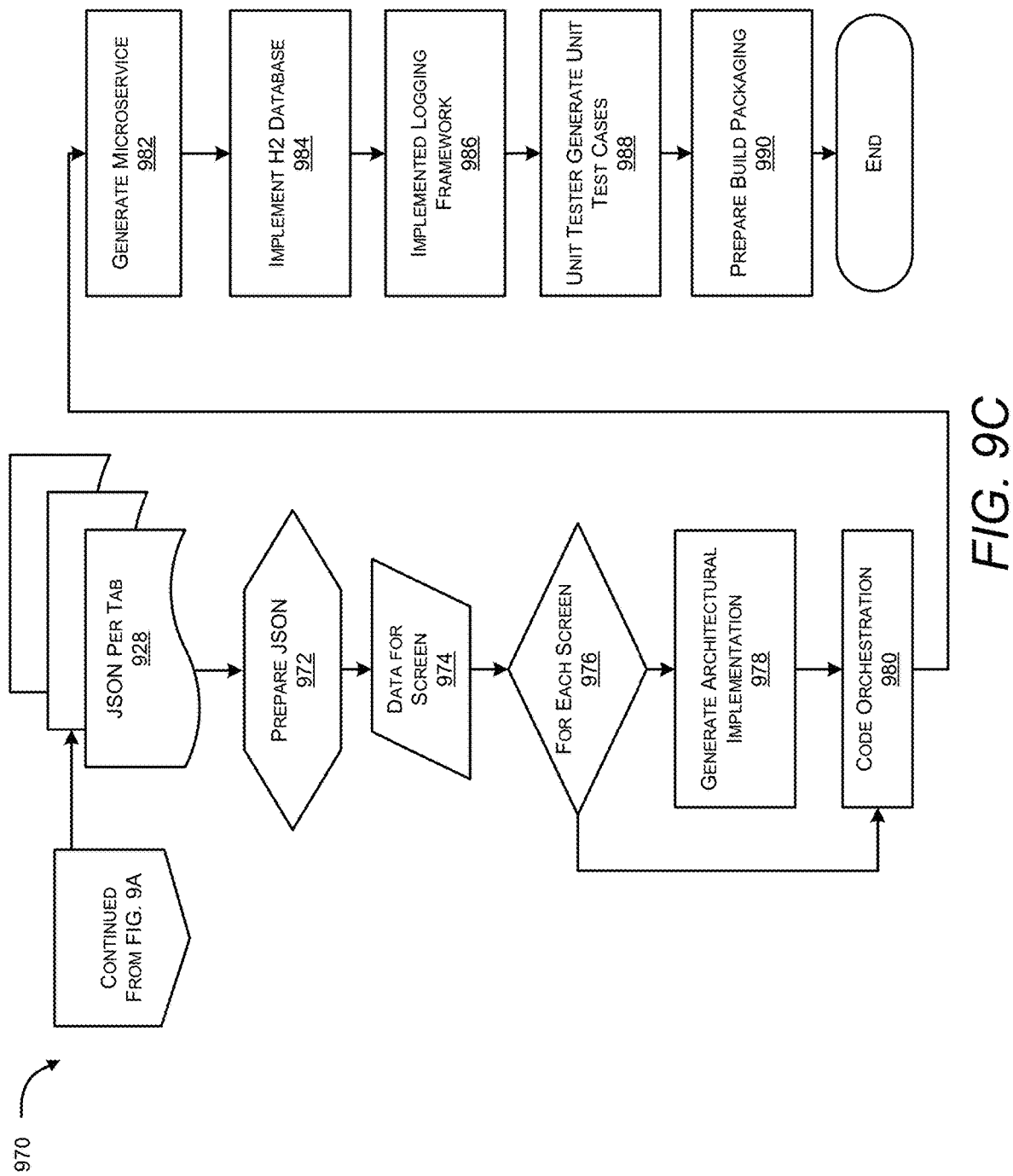

In an example embodiment, the method may include a step of evaluating the generated web pages. Further, the method may include a step of automatically computing a corresponding score value indicative of a correspondence of the generated web page in comparison to the expected web page. In an example embodiment, the score value may be computed based on a set of pre-defined factors pertaining to at least one of accessibility, value, utility, usability, searchability, credibility and compliance of the generated web page, FIGS. 9A-9C illustrate flow diagrams 900, 930 and 970 that depict multiple stages involved in facilitating automated customization of user interface, according to an example embodiment of the present disclosure. In an example embodiment, and in reference to FIG. 9A, the flow diagram 900 shows the various steps involved in the generation of the first executable file, which upon execution facilitates generation of the form. At 902, the method may prepare for creation of the input data in the form of a pre-defined template (for example, EXCEL® sheet template). At 904, the method may assess if the EXCEL® sheet template is saved and if not saved may return the file to step 902. If the EXCEL® sheet template may be saved, the method may initiate processing of the EXCEL® sheet template. At 908, the processing of the EXCEL® sheet template may be performed by parsing the input data in the EXCEL® sheet template to extract the input attributes in the form of components and corresponding key values. Based on the parsing, the method may evaluate (at 910) if the EXCEL® sheet template is valid. If the EXCEL® sheet template may not be valid, then the method may evaluate and display the error (906) and may prepare to repeating the step of preparation of the EXCEL® sheet template (step 902). If the EXCEL® sheet template may be valid, the method may further pre-process the EXCEL® sheet template. In an example embodiment, the input data in the EXCEL® sheet template may be parsed to extract the input attributes from each tab of the EXCEL® sheet template. Further, the input attributes extracted from each tab may include information pertaining to the components (as shown in the exemplary table in FIG. 3) and their corresponding values. At 912 and 914, the method may pre-process the information pertaining to the components and their corresponding values for each tab. Based on the extracted input attributes, at 916, the method may fetch component list from document library selected. For example, based on the extracted input attributes (such as components and their corresponding values), the method may include identification the corresponding document libraries and fetch the pre-stored file (pre-defined node-module package) from the database, such as, for example node module package (NPM) from a NPM artifactory. At 918, the document library along with key parameters and imports/packages may be fed to an AI engine of the processor. At 922 and 924, the method may include dynamic mapping that may be performed by matching the input attributes with the sample attributes with respect to each component. The AI engine may dynamically map the extracted input attributes with sample attributes of the pre-stored file (such as pre-defined node-module package) to obtain a form pertaining to the expected visual representation. In an example embodiment, the dynamic mapping may be performed using a first AI model include, for example, a Random Forest algorithm. The first AI model may be trained using a training data 920. In an example embodiment, the training data 920 may include available libraries that may be fed as input during training phase of the first AI model. In addition, the dynamic mapping may also utilize Natural Language Processing (NLP) techniques and component matching. The mapping may also allow to verify presence of error components. If no error components are found, at 926 and 928, based on the dynamic mapping, the method may generate a first executable file such as, for example in JSON format. The steps 912 to 928 may be repeated to generated JSON file for each tab. In an example embodiment, once the first executable file is prepared, an execution of the first executable file facilitates generation of the form (or screen).

In an example embodiment, and in reference to FIG. 9B, the flow diagram 930 shows the various steps involved in the generation of the web page and computing of a corresponding score. In continuation to step 928 (of FIG. 9A), at step 932, the method may prepare the creation of a second executable file (JSON file). In an example embodiment, UI engine of the processor may evaluate each generated form (or screen) 934. At 940, the method may include parsing of components (for each component 938), This may include fetching/reading data pertaining to each screen (936). This may be performed to verify if each line in the component adheres to a pre-defined format and/or properties. In an exemplary embodiment, if the data may adhere to the pre-defined format, the method may load the data into data objects, which may be leveraged by the application to create the components and populate its features and display relevant data and corresponding validations. At 942, the method may include a step of evaluation to assess if the components are valid. If the components may be invalid, the method may include removal of an error component corresponding to the invalid component (944). In an example embodiment, if the components may be valid, the method may include a step of responsive scaling (946) for the valid components through the AI engine followed by a step for generation of the second executable file (at 948 and 950). In an example embodiment, the AI engine 104 can facilitate to scale the component by using a second AI model that may include a K-Nearest Neighbour (KNN) algorithm. In an example embodiment, training data 956 may include available libraries that may be fed as input during training phase of the second AI model. For example, the training data may include collection of screens/snapshots on Internet used in various banking applications that may be fed along with a score as generated by a field expert (UI expert). The execution of the second executable file may lead to generation of the web page (also referred herein as screen output) i.e. steps 952 and 954 including processing of the screen and generation of the screen output. At 958 and 960, the method may include testing of the generated web pages to assess if the generated web pages are in compliance with an expected standard. At 958, the method may include unit test generation pertaining to unit testing to test individual units of source code to determine if they are ready to use. At 960, the method may include integration test generation that pertains to integration testing for checking integration between different software modules. At 962, the method may include evaluation of the generated web page for automatically computing a corresponding score value (964). The score may be computed based on a set of pre-defined factors. In an example embodiment, the set of pre-defined factors may pertain to at least one of accessibility, value, utility, usability, searchability, credibility and compliance of the generated web page. The score value may be indicative of a correspondence (or similarity) between the generated web page and the expected representation of the web page. The above described one or more steps in FIG. 9B may occur through co-ordinated functioning between the AI engine and UI engine of the processor.

In an example embodiment, and in reference to FIG. 9C, the flow diagram 970 shows the various steps involved in the generation of a microservice. In continuation to step 928 (of FIG. 9A), at step 972, the method may prepare for another executable file (JSON file) to generate a microservice corresponding to the generated web page via a microservice engine of the processor. The microservice may cater to processing and storage of data collected through the generated web page. At 974, the method may include fetching/reading data pertaining to each screen (or form). At 976, for each screen the method may implement generation of an architectural implementation (978) and code orchestration (980). At 982, the microservice may be generated for developing a software application through the web page, At 984, after the generation of the microservice, the method may include implementation of database such as, for example, H2 database, The implementation of database may be performed for running unit test cases in the next steps. At 986, the method may also facilitate implementation of logging framework to standardize the process of logging in the application. At 988 and 990, the method may include final steps of unit test generation for executing the unit test cases and preparing build packaging respectively, for the application.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A system comprising:
   an artificial intelligence (AI) engine, which, when executed using a processor, causes the engine to:
   receive, from a user, an input data in the form of a pre-defined template, wherein the pre-defined template facilitates the input data to be received in a user-readable format, the input data being indicative of an expected visual representation of a web page at a user interface, wherein the pre-defined template is a configurable document that facilitates the user to include the input data in an alphanumeric format, and wherein the input data pertains to selection of a descriptive feature pertaining to the expected visual representation of the web page, the descriptive feature including at least one of formatting style formatting size, theme, layout type and information related to components, component name, component properties, component values and associated events, and wherein the pre-defined template is a spreadsheet template:
   process the pre-defined template to extract input attributes corresponding to the input data;
   map dynamically, by using a first AI model of the engine, the input attributes with sample attributes of a pre-stored file in a database to obtain a form pertaining to the expected visual representation; and
   a user interface (UI) engine comprising a form engine, which, when executed using a processor, causes the form engine to customize the form for generation of the web page at the user interface, wherein the AI engine facilitates responsive scaling of the form depending on size attributes of the user interface,
   wherein the form engine evaluates the form by parsing the components therein to assess if the components are valid,
   wherein, if the components are valid, the AI engine performs the responsive scaling for the valid components and prepares a second file, wherein the responsive scaling is performed by using a second AI model wherein the responsive scaling is performed by utilizing techniques including at least one of Media query and Bootstrap, and wherein the first AI model includes Random Forest algorithm and the second AI model includes KNN algorithm, and
   wherein if the components are invalid, the form engine removes an error component corresponding to the invalid component.

2. The system as claimed in claim 1, wherein the system comprises a self-learning engine to:
   receive, from the user, a feedback corresponding to the generated web page; and implement, based on the feedback, a self learning loop for the AI model, wherein the self-learning loop facilitates an incorporation of the feedback during generation of a second expected web page corresponding to the user.

3. The system as claimed in claim 1, wherein the processing of the pre-defined template is performed by parsing the input data to extract the input attributes in the form of the components and corresponding key values.

4. The system as claimed in claim 1, wherein prior to the dynamic mapping, based on the extracted input attributes, the AT engine assesses each input attribute to generate key parameters required to obtain the expected visual representation of the web page, wherein the key parameters include at least one of Cascading Style Sheets (CSS) attributes, CSS class name, and document libraries.

5. The system as claimed in claim 4, wherein the pre-stored file includes a pre-defined node-module package that is retrieved by the AI engine from the database based on the generated key parameters, and
wherein, based on the dynamic mapping, the AI engine generates a first file such that an execution of the first file facilitates generation of the form, wherein the first file is in JavaScript Object Notation (JSON) format.

6. The system as claimed in claim 5, wherein the first file comprises information related to at least one of the input attributes, the key parameters, and pre-defined node-modules packages.

7. The system as claimed in claim 5, wherein the pre-defined template facilitates the user to incorporate pre-defined rules, wherein the pre-defined rules allow automated update of the pre-stored file, prior to generation of the first file.

8. The system as claimed in claim 1, wherein the user interface correspond to multiple target devices such that the size attributes of the user interface pertain to varying screen size of the multiple target devices, and
wherein the responsive scaling facilitates dynamic size base alteration of the web page depending on the size attributes of each target device from the multiple target devices.

9. The system as claimed in claim 1, wherein the second file is in JSON format.

10. The system as claimed in claim 1, wherein the UI engine comprises a test engine to test the generated web pages, and
wherein the AI engine evaluates the generated web page and automatically computes a corresponding score value indicative of a correspondence between the generated web page and the expected representation of the web page, and wherein the score value is computed based on a set of pre-defined factors.

11. The system as claimed in claim 10, wherein the set of pre-defined factors pertain to at least one of accessibility, value, utility, usability, searchability, credibility and compliance of the generated web page.

12. The system as claimed in claim 1, wherein the system comprises a microservice engine that generates a microservice corresponding to the generated web page, and
wherein the microservice is generated based on an architectural implementation and code orchestration, and wherein the micro-service caters to processing and storage of data collected through the generated web page.

13. The system as claimed in claim 1, wherein the microservice is generated for developing a software application through the web page, and
wherein, the processor facilitates incorporation of toll gates pertinent to the software application to be developed, and wherein the toll gates pertain to at least one of J-unit test coverage, integration test coverage, vulnerabilities, and issues leading to a possibility of outage.

14. A method for facilitating an automated customization of a user interface, the method comprising:
receiving, by a processor, an input data from a user, the input data being in the form of a pre-defined template, wherein the pre-defined template facilitates the input data to be received in a user-readable format, the input data being indicative of an expected visual representation of a web page at a user interface, wherein the pre-defined template is a configurable document that facilitates the user to include the input data in an alphanumeric format, and wherein the input data pertains to selection of a descriptive feature pertaining to the expected visual representation of the web page, the descriptive feature including at least one of formatting style, formatting size, theme, layout type and information related to components, component name, component properties, component values and associated events, and wherein the pre-defined template is a spreadsheet template;
processing, by the processor, the pre-defined template to extract input attributes corresponding to the input data;
mapping dynamically, by the processor, the input attributes with sample attributes of a pre-stored file in a database to obtain a form pertaining to the expected visual representation; and
customizing, by the processor, the form to generate the web page at the user interface, wherein the processor facilitates responsive scaling of the form depending on size attributes of the user interface,
wherein the form is evaluated by parsing the components therein to assess if the components are valid,
wherein, if the components are valid, the processor performs the responsive scaling for the valid components and prepares a second file, wherein the responsive scaling is performed by using a second AI model, wherein the responsive scaling is performed by utilizing techniques including at least one of Media query and Bootstrap, and wherein the first AI model includes Random Forest algorithm and the second AI model includes KNN algorithm, and
wherein if the components are invalid, an error component corresponding to the invalid component is removed.

15. The method as claimed in claim 14, the method comprising:
receiving, by the processor, a feedback from the user, the feedback corresponding to the generated web page; and
implementing, by the processor, based on the feedback, a self-learning loop for the AI model, wherein the self-learning loop facilitates an incorporation of the feedback during generation of a second expected web page corresponding to the user.

16. The method as claimed in claim 14, the method comprising:
evaluating, by the processor, the generated web pages; and
computing automatically, by the processor, a corresponding score value indicative of a correspondence of the generated web page in comparison to the expected web page, and wherein the score value is computed based on a set of pre-defined factors pertaining to at least one of accessibility, value, utility, usability, searchability, credibility and compliance of the generated web page.

17. A non-transitory computer readable medium, wherein the readable medium comprises machine executable instructions that are executable by a processor to:
receive an input data from a user, the input data being in the form of a pre-defined template, wherein the pre-defined template facilitates the input data to be received in a user-readable format, the input data being indicative of an expected visual representation of a web page at a user interface, wherein the pre-defined template is a configurable document that facilitates the user to include the input data in an alphanumeric format, and wherein the input data pertains to selection of a descriptive feature pertaining to the expected visual representation of the web page, the descriptive feature including at least one of formatting style, formatting size, theme, layout type and information related to components, component name, component properties, component values and associated events, and wherein the pre-defined template is a spreadsheet template;
process the pre-defined template to extract input attributes corresponding to the input data;
map dynamically, the input attributes with sample attributes of a pre-stored file in a database to obtain a form pertaining to the expected visual representation;
facilitate responsive scaling of the form depending on size attributes of the user interface; and
customize the form to generate the web page at the user interface, wherein the form is evaluated by parsing the components therein to assess if the components are valid,
wherein if the components are valid, the responsive scaling is performed for the valid components and a second file is prepared, wherein the responsive scaling is performed by using a second AI model, wherein the responsive scaling is performed by utilizing techniques including at least one of Media query and Bootstrap, and wherein the first AI model includes Random Forest algorithm and the second AI model includes KNN algorithm, and
wherein if the components are invalid, an error component corresponding to the invalid component is removed.

* * * * *